(12) United States Patent
Itou

(10) Patent No.: US 12,097,793 B2
(45) Date of Patent: Sep. 24, 2024

(54) CARGO BED STRUCTURE FOR UTILITY VEHICLE

(71) Applicant: KAWASAKI JUKOGYO KABUSHIKI KAISHA, Hyogo (JP)

(72) Inventor: Kouji Itou, Kobe (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 495 days.

(21) Appl. No.: 17/360,408

(22) Filed: Jun. 28, 2021

(65) Prior Publication Data
US 2022/0410781 A1 Dec. 29, 2022

(51) Int. Cl.
*B62D 33/023* (2006.01)
*B60P 1/28* (2006.01)

(52) U.S. Cl.
CPC ............ *B60P 1/28* (2013.01); *B62D 33/023* (2013.01)

(58) Field of Classification Search
CPC ......... B60P 1/28; B62D 33/023; B62D 33/02; B62D 25/2054
USPC ................... 410/109, 106, 112; 298/17 R
See application file for complete search history.

(56) References Cited

U.S. PATENT DOCUMENTS

| | | | | |
|---|---|---|---|---|
| 1,447,619 A * | 3/1923 | Ledwinka | .............. | B60P 1/286 296/183.1 |
| 3,666,315 A * | 5/1972 | Reimann | ................ | B60N 2/777 296/156 |
| 3,801,149 A * | 4/1974 | Reimann | .............. | B60N 2/6009 296/156 |
| 4,245,863 A * | 1/1981 | Carter | .................... | B60R 13/01 105/423 |
| 4,341,412 A * | 7/1982 | Wayne | ................... | B60R 13/01 296/39.2 |
| 4,505,508 A * | 3/1985 | Carter | .................... | B60R 13/01 105/423 |
| 4,592,583 A * | 6/1986 | Dresen | ................... | B60R 13/01 296/39.2 |
| 4,767,149 A * | 8/1988 | Rye | ........................ | B60R 13/01 224/543 |
| 4,944,612 A * | 7/1990 | Abstetar | ................ | B60R 13/01 296/97.23 |
| 5,221,119 A * | 6/1993 | Emery | ................... | B60R 13/01 220/495.01 |

(Continued)

FOREIGN PATENT DOCUMENTS

JP 6435300 B2 * 12/2018

*Primary Examiner* — Hilary L Gutman
(74) *Attorney, Agent, or Firm* — Wenderoth, Lind & Ponack, L.L.P.

(57) ABSTRACT

A cargo bed for a utility vehicle includes a cargo bed frame extending in a vehicle body longitudinal direction and a side surface panel covering a vehicle width direction inner side of the cargo bed frame. The cargo bed frame has an upper side frame and a lower side frame that are arranged separately in the vertical direction and extend in the vehicle body longitudinal direction. The side surface panel is arranged on the vehicle width direction inner side of the upper side frame and the lower side frame from the upper side frame through the lower side frame. The side surface panel has a bulging portion bulging to the vehicle width direction outer side relative to the vehicle width direction inner end portion of the upper side frame and the lower side frame in the vertical direction from the upper side frame side to the lower side frame side.

19 Claims, 8 Drawing Sheets

(56) References Cited

U.S. PATENT DOCUMENTS

| | | | | |
|---|---|---|---|---|
| 5,382,069 | A * | 1/1995 | Chambers | B60R 9/00 |
| | | | | 224/404 |
| 5,551,742 | A * | 9/1996 | Martindale | B60R 13/01 |
| | | | | 296/39.2 |
| 5,769,479 | A * | 6/1998 | Emery | B60R 13/01 |
| | | | | 296/39.2 |
| 6,003,923 | A * | 12/1999 | Scott | B60R 11/06 |
| | | | | 296/37.6 |
| 7,794,004 | B2 * | 9/2010 | Aebker | B60R 5/04 |
| | | | | 296/37.8 |
| 8,517,648 | B2 | 8/2013 | Kobayashi et al. | |
| 9,316,044 | B2 * | 4/2016 | Hemphill | B62D 33/0273 |
| 9,731,775 | B1 * | 8/2017 | Tsumiyama | B60R 9/065 |
| 9,868,403 | B2 * | 1/2018 | Pulleyblank | B60R 9/06 |
| 10,005,405 | B2 * | 6/2018 | McDonald, Jr. | B60R 13/01 |
| 10,493,892 | B2 * | 12/2019 | Tsumiyama | B62D 33/02 |
| 10,640,029 | B2 * | 5/2020 | Tashiro | B60P 1/28 |
| 11,624,215 | B2 * | 4/2023 | Martin | B60P 1/283 |
| | | | | 292/336.3 |
| 2003/0001409 | A1 * | 1/2003 | Semple | B62D 33/02 |
| | | | | 296/183.1 |
| 2005/0236867 | A1 * | 10/2005 | McNulty | B62D 25/16 |
| | | | | 296/183.1 |
| 2005/0242620 | A1 * | 11/2005 | McNulty | B62D 33/023 |
| | | | | 296/183.1 |
| 2014/0225395 | A1 * | 8/2014 | Takata | B62D 23/005 |
| | | | | 296/183.1 |
| 2015/0123425 | A1 * | 5/2015 | Huston | B60P 7/0815 |
| | | | | 296/183.1 |
| 2016/0185271 | A1 * | 6/2016 | Tsumiyama | B60R 11/06 |
| | | | | 298/17 R |
| 2018/0186270 | A1 * | 7/2018 | Tsumiyama | B62D 33/02 |

* cited by examiner

CARGO BED STRUCTURE FOR UTILITY VEHICLE

BACKGROUND OF THE INVENTION

Field of the Invention

The present invention relates to a cargo bed structure for a utility vehicle.

Description of Related Art

As described in U.S. Pat. No. 8,517,648, a utility vehicle includes a cargo bed in the rear of the riding space. It is also known that a cargo bed of a utility vehicle is configured to be tilted rearward by a dump mechanism so that a loaded object can be discharged from the rear of the cargo bed.

SUMMARY OF THE INVENTION

A cargo bed provided in a utility vehicle is sometimes formed in a box shape by a bottom surface panel, a front surface panel, a rear surface panel, and side surface panels on both sides in the vehicle width direction using a resin material from the viewpoint of weight reduction or the like. In order to improve the durability and the transportability of such a cargo bed, it is desired to improve the strength of the cargo bed and to increase the loading capacity of the cargo bed.

Therefore, an objective of the present invention is to provide a cargo bed structure for a utility vehicle capable of improving the strength of the cargo bed and increasing the loading capacity of the cargo bed.

In order to achieve the above objective, the present invention provides a cargo bed structure for a utility vehicle that has a cargo bed in a vehicle body rear portion, in which the cargo bed includes a cargo bed frame that extends in a vehicle body longitudinal direction and a side surface panel that covers a vehicle width direction inner side of the cargo bed frame, the cargo bed frame has an upper side frame and a lower side frame that are arranged separately in a vertical direction and extend in a vehicle body longitudinal direction, the side surface panel is arranged on a vehicle width direction inner side of the upper side frame and the lower side frame from the upper side frame through the lower side frame, and the side surface panel has a bulging portion that bulges to a vehicle width direction outer side relative to a vehicle width direction inner end portion of the upper side frame and the lower side frame in a vertical direction from the upper side frame side to the lower side frame side.

According to the present invention, since the side surface panel that is arranged on the vehicle width direction inner side of the cargo bed frame is provided with the bulging portion that bulges to the vehicle width direction outer side relative to the vehicle width direction inner end portion of the upper side frame and the lower side frame from the upper side frame side to the lower side frame side, it is possible to increase a loading space of the cargo bed and increase the loading capacity of the cargo bed by the bulging portion, compared with a case where the side surface panel is not provided with a bulging portion. It is possible to reinforce the side surface panel by the upper side frame and the lower side frame, and it is possible to improve the strength of the cargo bed.

In one aspect of the present invention, the bulging portion has a tilt surface portion that is arranged on the upper side frame side and tilts on a vehicle width direction outer side from the upper side frame side toward a lower side.

According to the present aspect, since the bulging portion of the side surface panel is provided with the tilt surface portion that tilts on the vehicle width direction outer side from the upper side frame side toward the lower side, it is possible to make the loading space of the cargo bed larger in the lower side part of the cargo bed than in the upper side part of the cargo bed, and it is possible to stably retain a loaded object on the cargo bed. When it is necessary to load a long object on the cargo bed in the vehicle width direction, it is possible to suppress the load to the vehicle width direction outer side acting on the side surface panel when the loaded object interferes with the tilt surface portion of the side surface panel, and to guide the loaded object to the lower side of the cargo bed.

In one aspect of the present invention, the bulging portion includes a bottom surface portion that is arranged on the lower side frame side and extends in a direction orthogonal to a vertical direction from a vehicle width direction inner side to a vehicle width direction outer side, and a vertical surface portion that extends on an upper side from a vehicle width direction outer end portion of the bottom surface portion.

According to the present aspect, since the bulging portion of the side surface panel is provided with the vertical surface portion that extends on the upper side from the vehicle width direction outer end portion of the bottom surface portion, it is possible to increase the loading space of the cargo bed in the lower side part of the cargo bed and increase the loading capacity of the cargo bed as compared with the case where the lower end portion of the tilt surface portion that tilts in the vehicle width direction outer side from the upper side frame side toward the lower side is connected to the vehicle width direction outer end portion of the bottom surface portion without providing the vertical surface portion.

In one aspect of the present invention, the bulging portion has a cross-sectional shape that is perpendicular to a vehicle body longitudinal direction, the cross-sectional shape formed to be identical in a vehicle body longitudinal direction.

According to the present aspect, it is possible to increase the loading capacity of the cargo bed by the bulging portion in which the cross-sectional shape that is perpendicular to the vehicle body longitudinal direction is formed to be identical in the vehicle body longitudinal direction. When the loaded object is discharged by the dump mechanism tilting the cargo bed rearward, it is possible to easily move the loaded object rearward and easily discharge the loaded object.

In one aspect of the present invention, the bulging portion is formed such that a vehicle width direction outer end portion is arranged on a vehicle width direction inner side relative to a vehicle width direction outer end portion of the cargo bed frame.

According to the present aspect, since the bulging portion of the side surface panel is formed such that the vehicle width direction outer end portion is arranged on the vehicle width direction inner side relative to the vehicle width direction outer end portion of the cargo bed frame, it is possible to increase the loading capacity of the cargo bed while suppressing the cargo bed from becoming large due to the bulging portion protruding on the vehicle width direction outer side relative to the vehicle width direction outer end portion of the cargo bed frame.

In one aspect of the present invention, the cargo bed frame has a front side frame that couples a vehicle body front side of the upper side frame and the lower side frame and extends in a vertical direction, and a rear side frame that couples a vehicle body rear side of the upper side frame and the lower side frame and extends in a vertical direction, the side surface panel is arranged on a vehicle width direction inner side of the front side frame and the rear side frame at least from the front side frame to the rear side frame, and the bulging portion is provided between the front side frame and the rear side frame.

According to the present aspect, since the bulging portion of the side surface panel is provided between the front side frame and the rear side frame, the bulging portion is formed in a region surrounded by the upper side frame, the lower side frame, the front side frame, and the rear side frame, and it is possible to increase the loading capacity of the cargo bed while suppressing the cargo bed from becoming large.

In one aspect of the present invention, the side surface panel includes an inner side surface panel that is arranged on a vehicle width direction inner side of the cargo bed frame, and an outer side surface panel that is arranged on a vehicle width direction outer side of the cargo bed frame, the inner side surface panel extends toward a vehicle width direction outer side above the cargo bed frame from a vehicle width direction inner side of the cargo bed frame, and is joined to the outer side surface panel, and the cargo bed frame is arranged in a space portion partitioned by the inner side surface panel and the outer side surface panel.

According to the present aspect, since the cargo bed frame is arranged in a space portion partitioned by the inner side surface panel and the outer side surface panel constituting the side surface panel, it is possible to suppress the cargo bed frame from being exposed to the outside and the appearance from deteriorating, and it is possible to improve the appearance of the utility vehicle.

In one aspect of the present invention, the cargo bed frame is made of metal, and the side surface panel is made of resin.

According to the present aspect, since the cargo bed frame is made of metal and the side surface panel is made of resin, it is possible to improve the strength of the cargo bed by the metal cargo bed frame while reducing the weight by the resin side surface panel.

In one aspect of the present invention, the cargo bed includes at least one rear lamp unit that is arranged in the rear of a vehicle body of the cargo bed, and the bulging portion is arranged on a vehicle body front side of the rear lamp unit at a position overlapping the rear lamp unit in a vehicle width direction as viewed from the rear of a vehicle body.

According to the present aspect, since the bulging portion of the side surface panel is arranged on the vehicle body front side of the rear lamp unit at a position overlapping the rear lamp unit in the vehicle width direction, it is possible, in the utility vehicle including the rear lamp unit in the cargo bed, to increase the loading capacity of the cargo bed while suppressing the cargo bed from becoming large in the vehicle width direction, as compared with the case where the bulging portion of the side surface panel and the rear lamp unit are provided separately in the vehicle width direction.

DETAILED DESCRIPTION OF THE PREFERRED EMBODIMENT

A utility vehicle including a cargo bed structure according to an embodiment of the present invention will be described below with reference to the accompanying drawings. The utility vehicle is mainly a vehicle for off-road traveling such as unpaved mountain roads, forest roads, muddy roads, and rocky fields, as well as grass fields, gravel fields, and sandy fields. In the present description, "front", "rear", "left", and "right" refer to a front direction, a rear direction, a left direction, and a right direction as viewed from the driver on board the utility vehicle.

Figure 1:
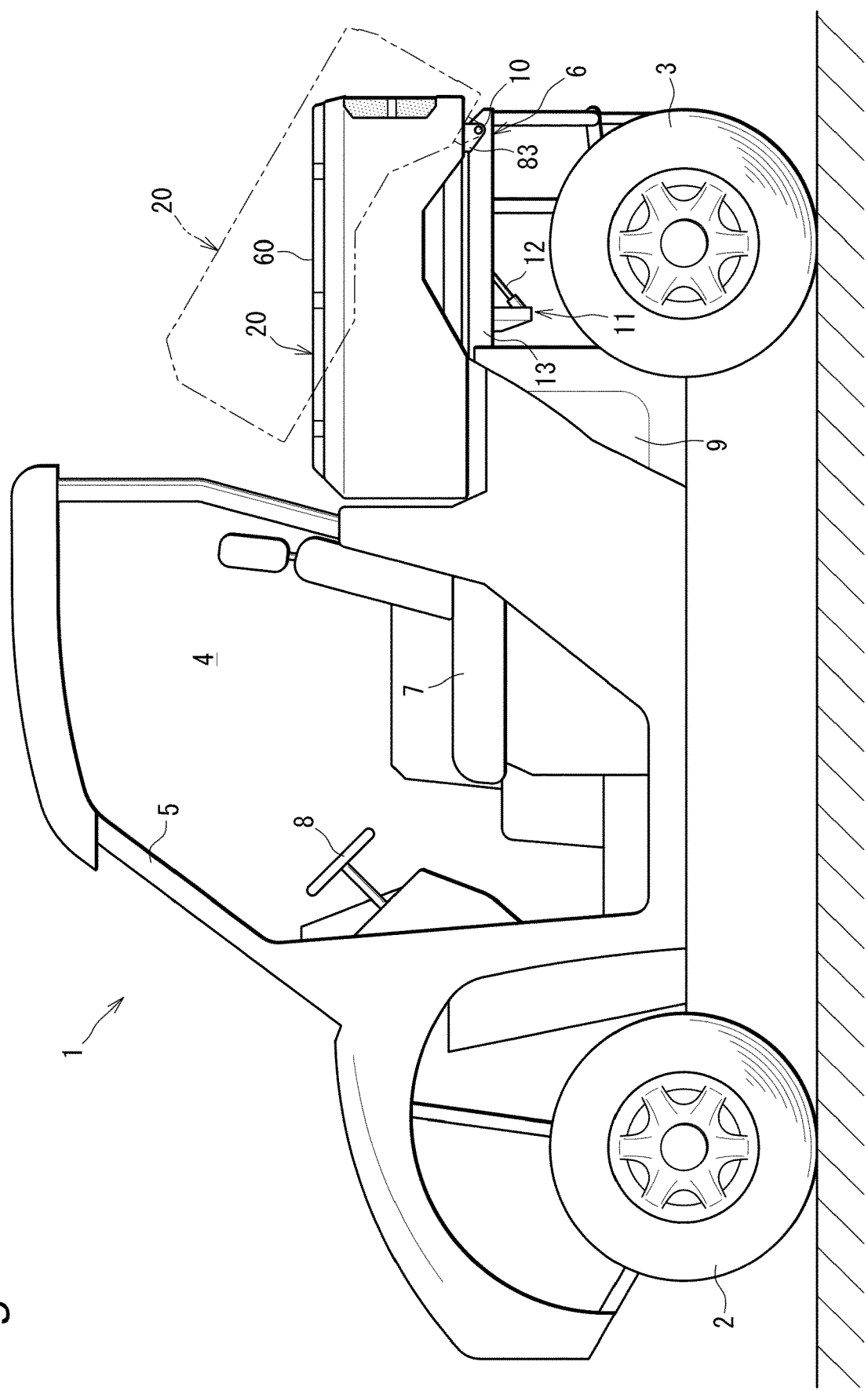
FIG. 1 is a side view of a utility vehicle including a cargo bed structure according to an embodiment of the present invention.
Figure 2:
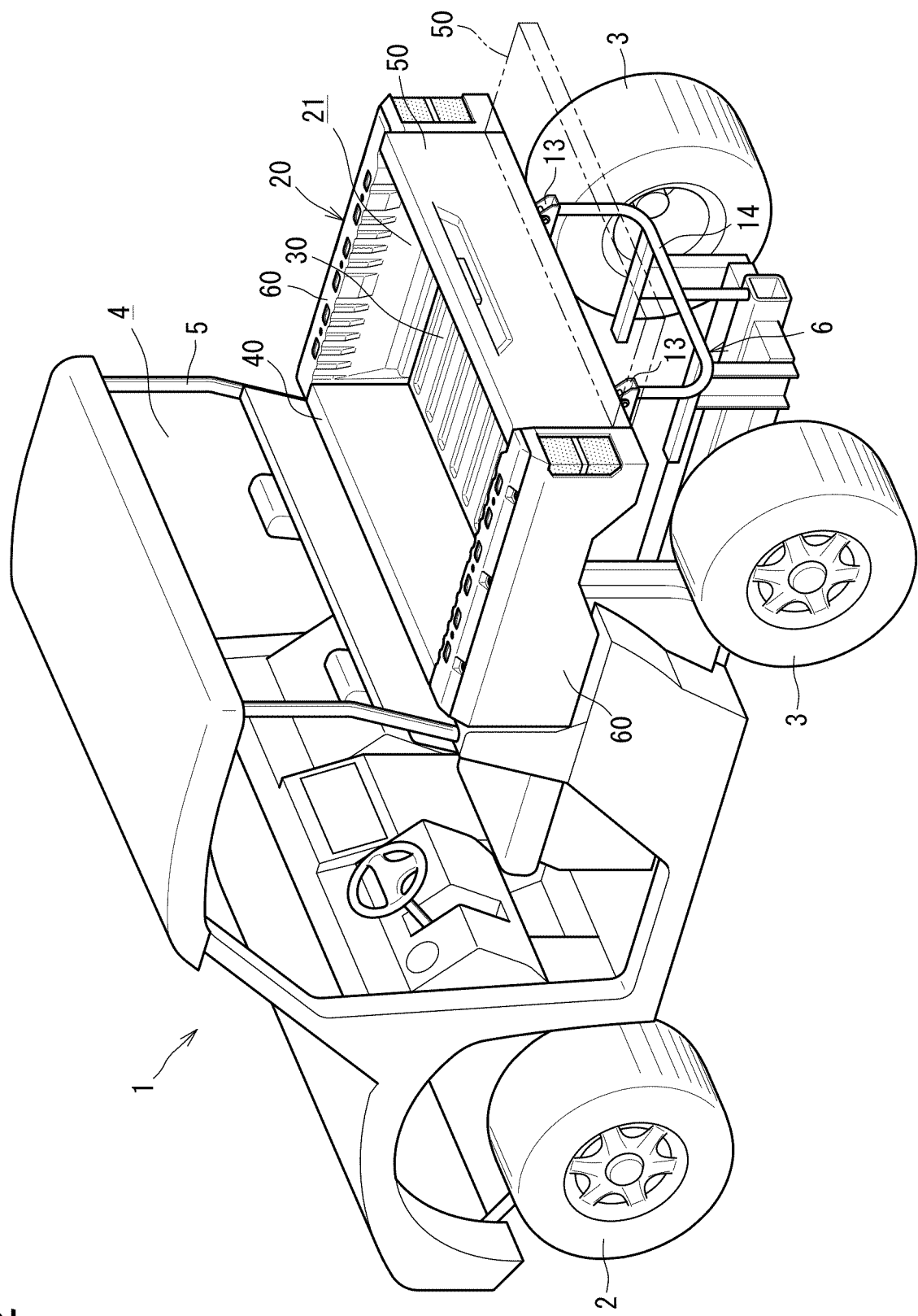
FIG. 2 is a perspective view of the utility vehicle.

FIG. 1 is a side view of the utility vehicle including the cargo bed structure according to one embodiment of the present invention, and FIG. 2 is a perspective view of the utility vehicle. As shown in FIGS. 1 and 2, a utility vehicle 1 includes a pair of right and left front wheels 2 at a vehicle body front portion and a pair of right and left rear wheels 3 in a vehicle body rear portion, and a riding space (vehicle compartment) 4 in which an occupant including a driver is on board is provided between the front wheels 2 and the rear wheels 3.

The riding space 4 is surrounded by a ROPS 5. The ROPS 5 is an abbreviation of rollover protection structure and is a part of a vehicle body frame 6. A seat 7 is arranged in the riding space 4, and an operation unit 8 such as a steering wheel is provided in front of the seat 7.

A cargo bed 20 is provided in the rear of the riding space 4. The cargo bed 20 is arranged in the rear portion of the vehicle body, and an engine 9 is arranged below the cargo bed 20. The drive force from the engine 9 is transmitted to the pair of right and left front wheels 2 and rear wheels 3 via a transmission (not illustrated).

As shown in FIG. 2, the cargo bed 20 includes a bottom wall 30, a front wall 40, a rear wall (tail gate) 50, and side walls 60 on the vehicle body right side and the vehicle body left side, and is formed in a substantially rectangular box shape. The bottom wall 30, the front wall 40, the rear wall 50, and the side walls 60 on both sides form a loading space 21 in which a loaded object such as a cargo is loaded. The cargo bed 20 is rotatably supported to the vehicle body frame 6 via right and left support shafts 10 arranged on the rear lower side of the cargo bed 20.

The utility vehicle 1 is a dump vehicle in which the cargo bed 20 is configured to be tiltable, and as shown in FIG. 1, a dump mechanism 11 is provided below the cargo bed 20. The dump mechanism 11 includes a cylinder 12 fixed to the vehicle body frame 6, and a tip end portion of the cylinder 12 is attached to the cargo bed 20 on a vehicle body front side relative to the support shaft 10.

The cargo bed 20 can be repositioned by the dump mechanism 11 between a horizontal position (a position indicated by a solid line in FIG. 1) in which the front portion and the rear portion of the cargo bed 20 are arranged in a substantially horizontal direction and a tilt position (a position indicated by a two-dot chain line in FIG. 1) in which the front portion of the cargo bed 20 is raised with respect to the rear portion and tilts rearward.

The rear wall 50 is rotatably supported to the side walls 60 on both sides in the vehicle width direction, and can be repositioned between a closed position (a position indicated by a solid line in FIG. 2) extending in a direction orthogonal to the bottom wall 30 and an open position (a position indicated by a two-dot chain line in FIG. 2) extending in parallel to the bottom wall 30. By repositioning the cargo bed 20 to a tilt position by the dump mechanism 11 in a state where the rear wall 50 is arranged in an open position, the utility vehicle 1 can discharge, from the rear of the cargo bed 20, the loaded object loaded in the loading space 21.

The vehicle body frame 6 includes a seat frame (not illustrated) that supports the seat 7, a pair of right and left rear frames 13 that extend rearward from the seat frame, and a plurality of rear cross frames 14 that are installed between the right and left rear frames 13 and extend in the vehicle width direction. A support bracket (not illustrated) that supports the bottom wall 30 of the cargo bed 20 from below is attached to each of the upper surface of the right and left rear frames 13, and the support shaft 10 is attached to the rear portion of each of the right and left rear frames 13. The cylinder 12 constituting the dump mechanism 11 is attached to the rear cross frame 14.

Figure 3:
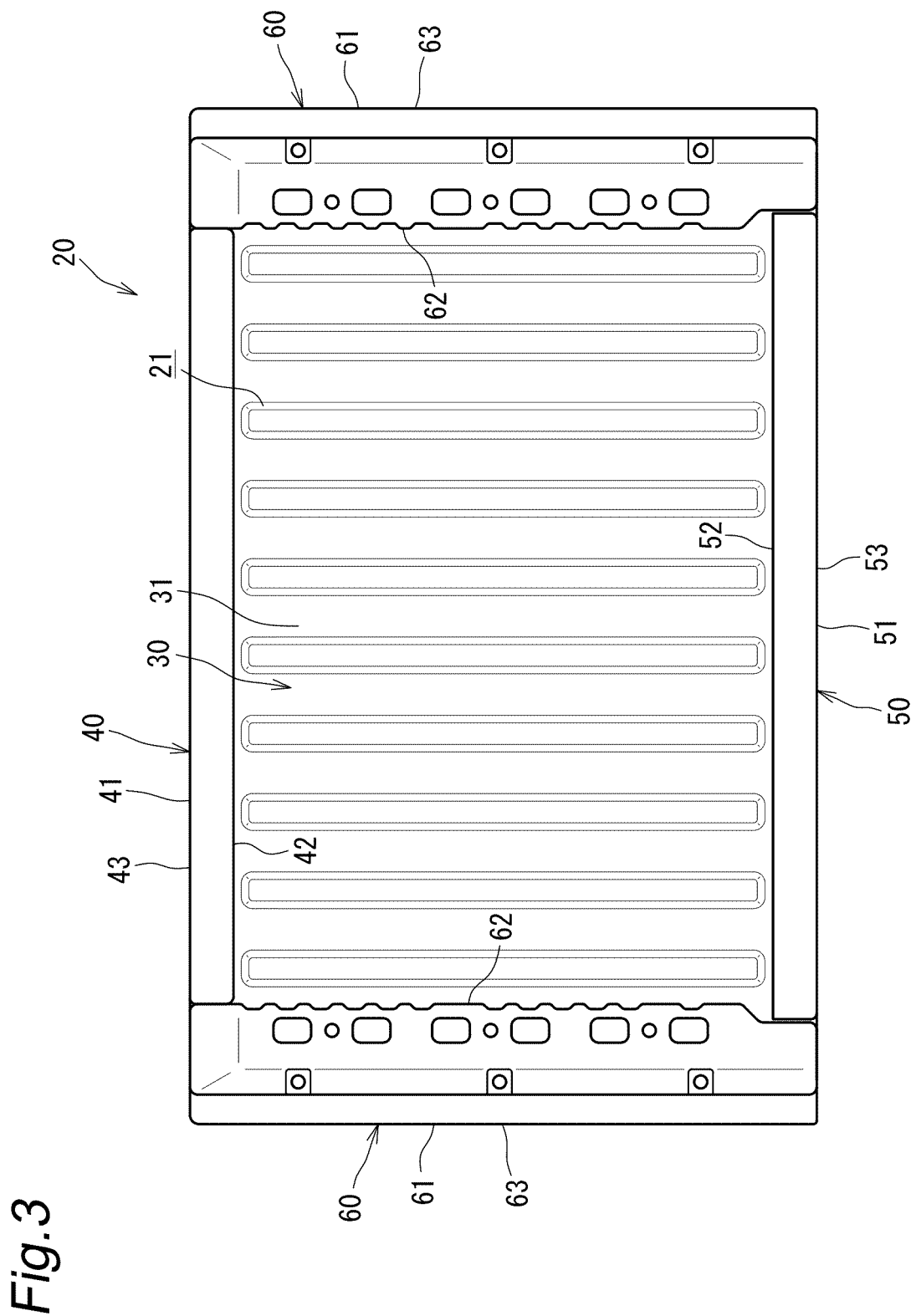
FIG. 3 is a top view of the cargo bed.
Figure 4:
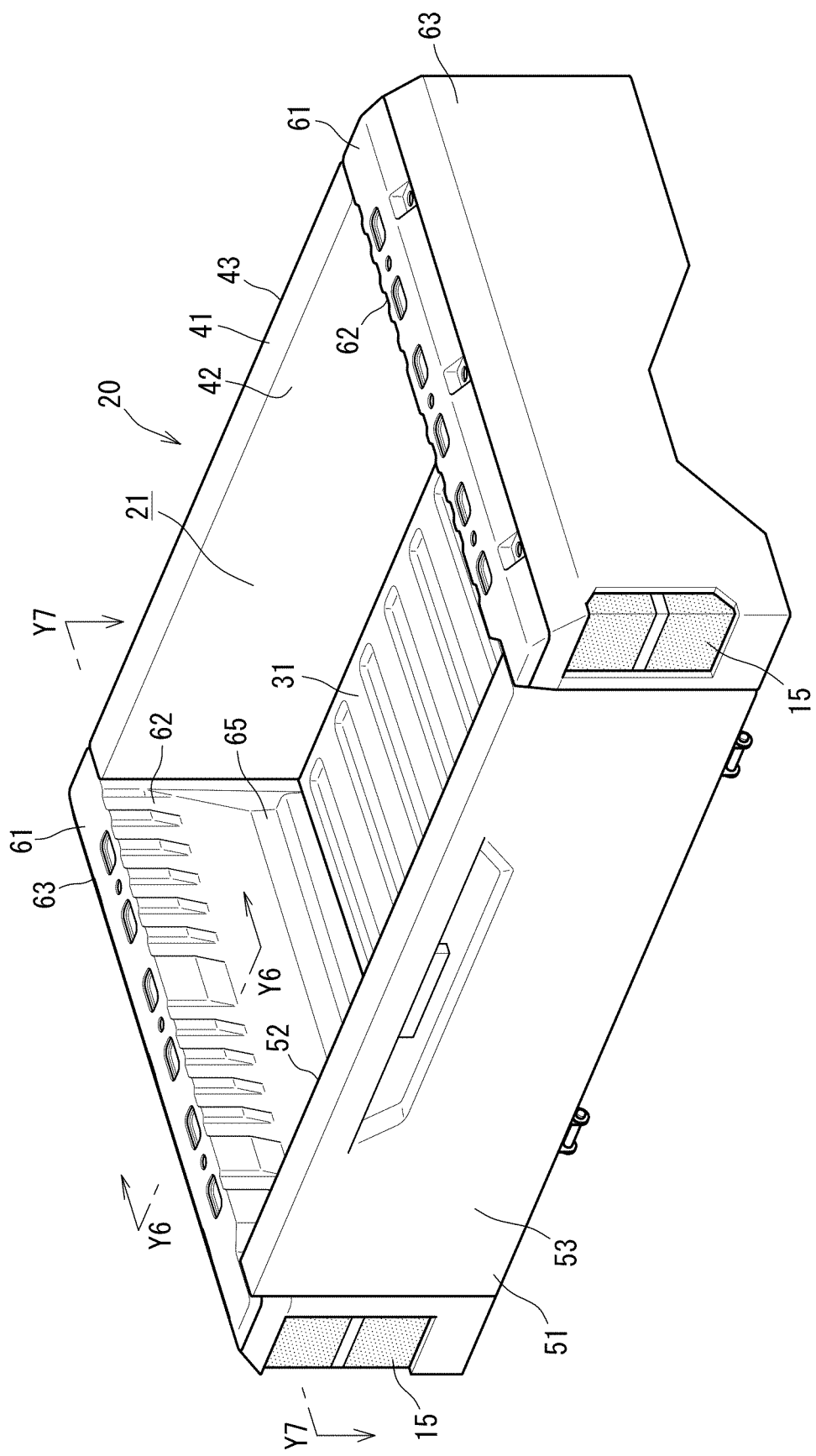
FIG. 4 is a perspective view of the cargo bed.

FIG. 3 is a top view of the cargo bed, and FIG. 4 is a perspective view of the cargo bed. As shown in FIGS. 3 and 4, the cargo bed 20 includes a bottom surface panel 31 constituting the bottom wall 30, a front surface panel 41 constituting the front wall 40, a rear surface panel 51 constituting the rear wall 50, and side surface panels 61 on both sides constituting the side walls 60 on both sides in the vehicle width direction.

The bottom surface panel 31 is formed in a substantially rectangular shape in plan view and extends in a substantially horizontal direction. The front surface panel 41 and the rear surface panel 51 extend in parallel to each other in a substantially perpendicular direction and in the vehicle width direction on the vehicle body front side and the vehicle body rear side of the bottom surface panel 31, and are formed in a substantially rectangular shape as viewed from the rear of the vehicle body. The side surface panels 61 on both sides extend in parallel to each other in a substantially perpendicular direction and in the vehicle body longitudinal direction on the vehicle body right side and the vehicle body left side of the bottom surface panel 31, and are formed in a substantially rectangular shape as viewed from the vehicle body side.

The loading space 21 is partitioned by the bottom surface panel 31, the front surface panel 41, the rear surface panel 51, and the side surface panels 61 on both sides, and is formed in a substantially rectangular box shape. As mentioned earlier, the rear surface panel 51 constituting the rear wall 50 is rotatably supported to the side surface panels 61 on both sides and can be repositioned between the closed position and the open position.

Figure 5:
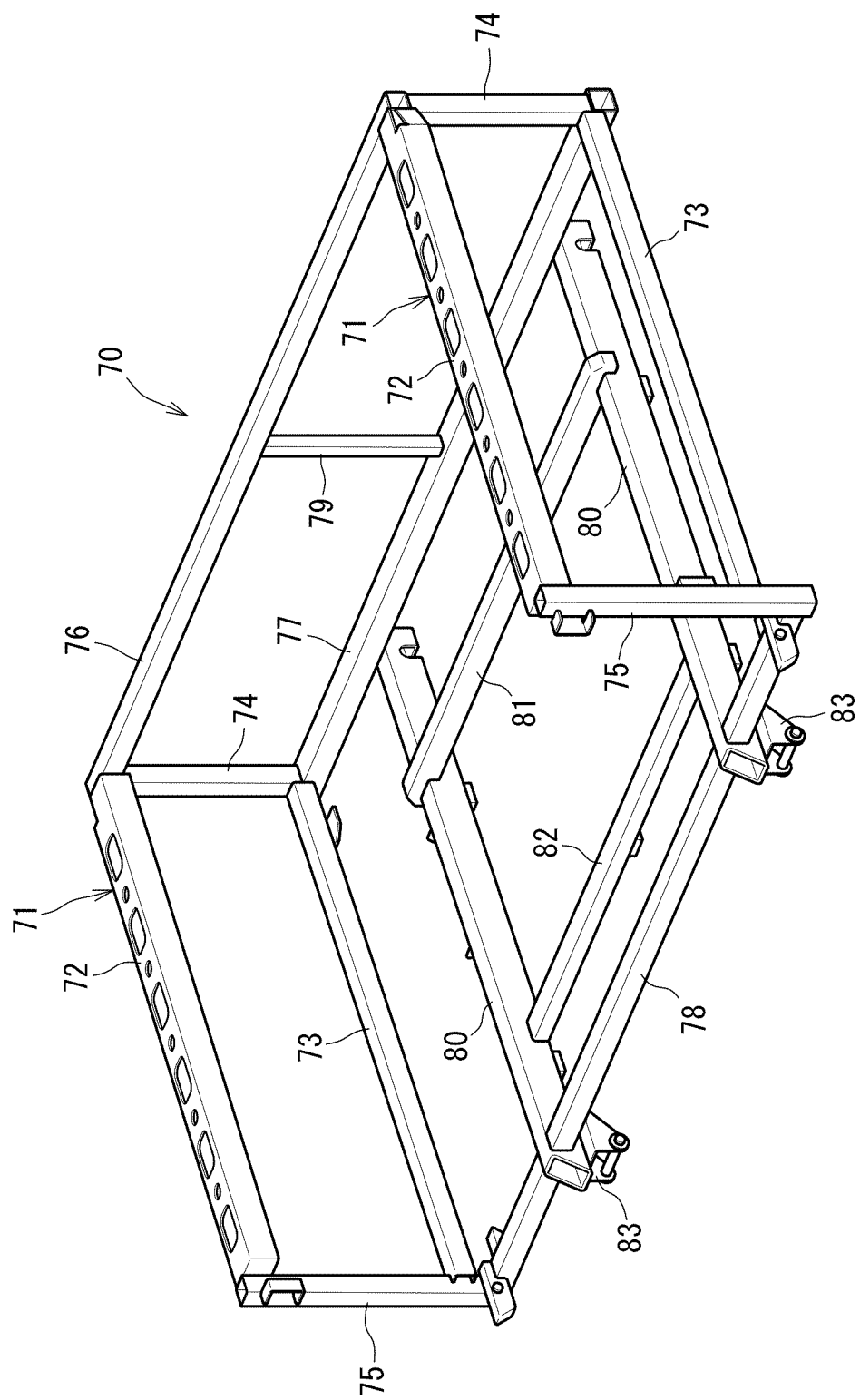
FIG. 5 is a perspective view of a skeleton frame of the cargo bed.
Figure 6:
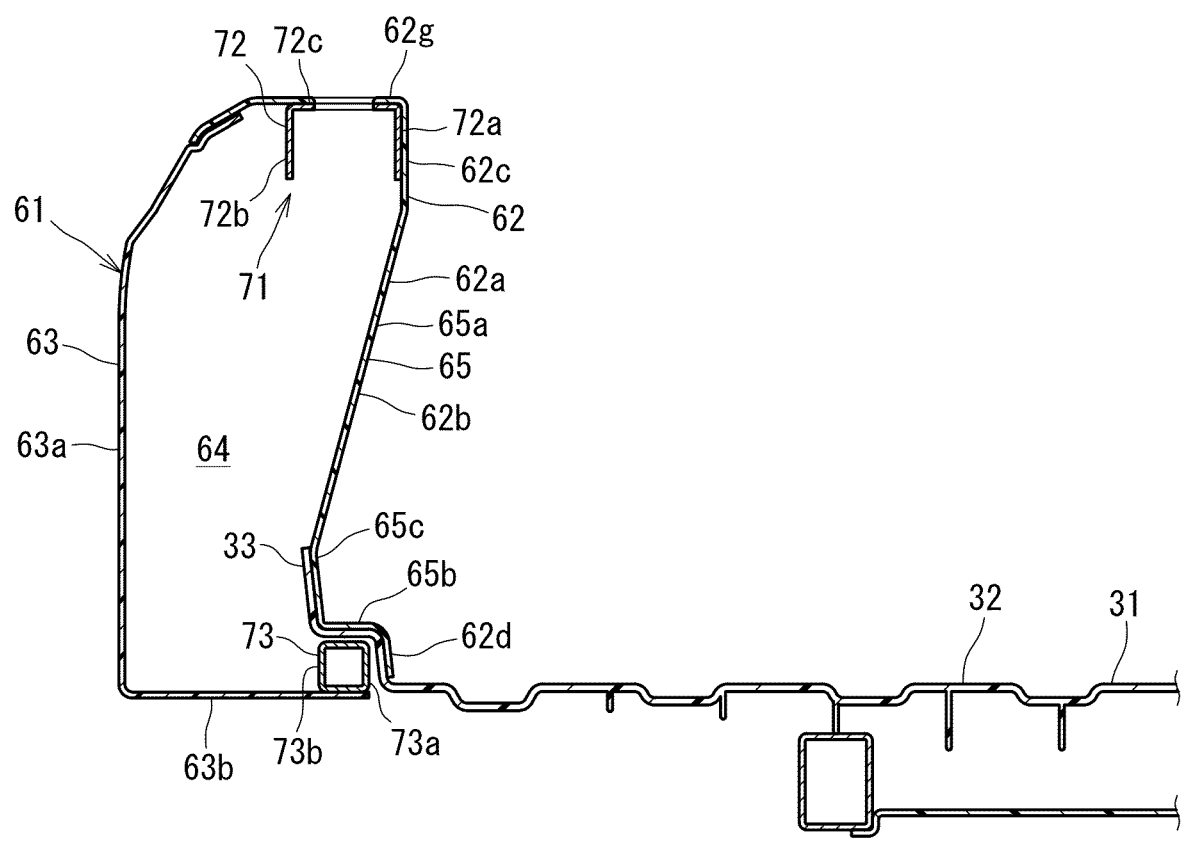
FIG. 6 is a longitudinal section view of a side wall of the cargo bed along a line Y6-Y6 of FIG. 4.
Figure 7:
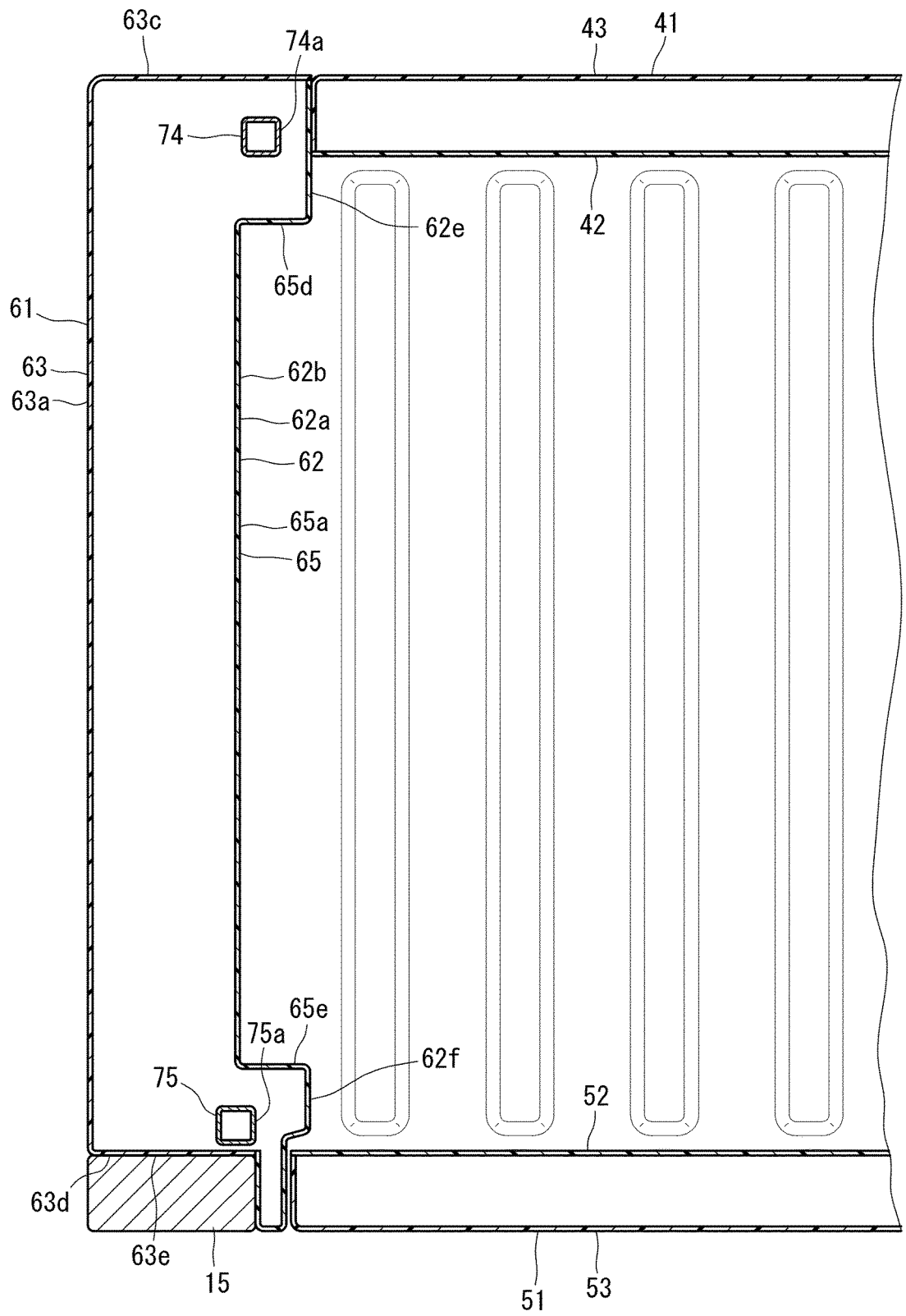
FIG. 7 is a cross section view of the side wall of the cargo bed along a line Y7-Y7 of FIG. 4.

FIG. 5 is a perspective view of the skeleton frame of the cargo bed, FIG. 6 is a longitudinal section view of the side wall of the cargo bed along the line Y6-Y6 of FIG. 4, and FIG. 7 is a cross section view of the side wall of the cargo bed along the line Y7-Y7 of FIG. 4. As shown in FIG. 5, the cargo bed 20 includes a skeleton frame 70 that forms the framework of the cargo bed 20. The bottom surface panel 31, the front surface panel 41, and the side surface panels 61 on both sides are attached to the skeleton frame 70 so as to cover the inside of the skeleton frame 70.

The skeleton frame 70 is formed of a metal material such as iron, and the bottom surface panel 31, the front surface panel 41, the rear surface panel 51, and the side surface panels 61 on both sides are formed of a resin material. The skeleton frame 70 functions as a reinforcement member that reinforces the bottom surface panel 31, the front surface panel 41, and the side surface panels 61 on both sides.

The skeleton frame 70 includes a side frame 71 as a cargo bed frame arranged on each of the both sides in the vehicle width direction and formed in a substantially rectangular frame shape. The side frame 71 has an upper side frame 72 arranged on a vehicle body upper side and extending in the vehicle body longitudinal direction, and a lower side frame 73 arranged on a vehicle body lower side and extending in the vehicle body longitudinal direction, and the upper side frame 72 and the lower side frame 73 are arranged in parallel in a substantially horizontal direction. The upper side frame 72 is formed in a substantially U-shaped cross section with the lower side open, and the lower side frame 73 is formed in a substantially quadrangular cross section.

The side frame 71 has a front side frame 74 that couples the vehicle body front side of the upper side frame 72 and the vehicle body front side of the lower side frame 73 and extends in the vertical direction, and a rear side frame 75 that couples the vehicle body rear side of the upper side frame 72 and the vehicle body rear side of the lower side frame 73 and extends in the vertical direction. The front side frame 74 and the rear side frame 75 are arranged in parallel in a substantially perpendicular direction and formed in a substantially quadrangular cross section. The rear side frame 75 is longer than the front side frame 74 and extends to a lower side relative to the front side frame 74.

The skeleton frame 70 has a first front side cross frame 76 that couples the vehicle body upper sides of the front side frames 74 on both sides and extends in the vehicle width direction, a second front side cross frame 77 that couples the vehicle body lower sides of the front side frames 74 on both sides and extends in the vehicle width direction, and a rear side cross frame 78 that couples the vehicle body lower sides of the rear side frames 75 on both sides and extends in the vehicle width direction. The first and second front side cross frames 76 and 77 and the rear side cross frame 78 are arranged in parallel to one another in a substantially horizontal direction and formed in a substantially quadrangular cross section.

The center sides in the vehicle width direction of the first and second front side cross frames 76 and 77 are coupled by a center frame 79 extending in the vertical direction. The center frame 79 extends in a substantially perpendicular direction in parallel with the front side frame 74, and formed in a substantially quadrangular cross section.

The skeleton frame 70 includes a pair of right and left floor frames 80 arranged above the rear frame 13 of the vehicle body frame 6 and extending in the vehicle body longitudinal direction. The right and left floor frames 80 are arranged in parallel and separated in the vehicle width direction, and have front end portions coupled to the second front side cross frame 77 and rear end portions coupled to the rear side cross frame 78.

First and second floor cross frames 81 and 82 that are separated in the vehicle body longitudinal direction and extend in parallel in the vehicle width direction are installed between the right and left floor frames 80. The first floor cross frame 81 arranged on the vehicle body front side is arranged on the vehicle body upper side relative to the second floor cross frame 82 arranged on the vehicle body rear side. The first and second floor cross frames 81 and 82 are formed in a substantially rectangular cross section.

The floor frame 80 is supported from below by a support bracket attached to the rear frame 13 of the vehicle body frame 6, and a pivot bracket 83 attached to the rear end portion of the floor frame 80 is rotatably supported by the support shaft 10. In the cargo bed 20, the skeleton frame 70 is rotatably supported with respect to the vehicle body frame 6.

As shown in FIG. 3, the bottom surface panel 31 attached to the skeleton frame 70 includes a bottom surface portion 32 formed in a substantially rectangular shape in plan view, an upper side flange portion 33 (see FIG. 6) extending upward from the vehicle body front side and both sides in the vehicle width direction of the bottom surface portion 32, and a lower side flange portion extending downward from the vehicle body rear side of the bottom surface portion 32, and is attached to the skeleton frame 70 such that the bottom surface portion 32 tilts downward and rearward.

The front surface panel 41 includes an inner front surface panel 42 arranged on a vehicle body rear side that is an inner side of the cargo bed and an outer front surface panel 43 arranged on a vehicle body front side that is an outer side of the cargo bed. The inner front surface panel 42 and the outer front surface panel 43 are attached to the first and second front side cross frames 76 and 77, respectively. The lower portion of the inner front surface panel 42 is attached to the second front side cross frame 77 across the upper side flange portion 33 of the bottom surface panel 31.

The rear surface panel 51 includes an inner rear surface panel 52 arranged on a vehicle body front side that is an inner side of the cargo bed and an outer rear surface panel 53 arranged on a vehicle body rear side that is an outer side of the cargo bed, and the inner rear surface panel 52 and the outer rear surface panel 53 are joined to form a substantially rectangular parallelepiped shape. Lock mechanisms (not illustrated) are attached to the upper portion of the rear surface panel 51 on both sides in the vehicle width direction, and the lock mechanisms can lock the rear surface panel 51 to the closed position. The rear surface panel 51 can also be repositioned to the open position by releasing the lock of the rear surface panel 51 by the lock mechanism.

The side surface panels 61 on the vehicle body right side and on the vehicle body left side are formed symmetrically in the vehicle width direction. Although the side surface panel 61 on the vehicle body left side will be described, the side surface panel 61 on the vehicle body right side is formed in the same manner. The side surface panel 61 is attached to the side frame 71 so as to cover the vehicle width direction inner side of the side frame 71. The side surface panel 61 includes an inner side surface panel 62 arranged on the vehicle width direction inner side that is an inside of the cargo bed, and an outer side surface panel 63 arranged on the vehicle width direction outer side that is an outside of the cargo bed. The inner side surface panel 62 is arranged on the vehicle width direction inner side of the side frame 71, and the outer side surface panel 63 is arranged on the vehicle width direction outer side of the side frame 71.

As shown in FIG. 6, the inner side surface panel 62 extends toward the vehicle width direction outer side above the side frame 71 from the vehicle width direction inner side of the side frame 71, and is joined to the outer side surface panel 63. The side frame 71 is arranged in a space portion 64 partitioned by the inner side surface panel 62 and the outer side surface panel 63.

The inner side surface panel 62 is arranged on the vehicle width direction inner side of the upper side frame 72 and the lower side frame 73 from the upper side frame 72 to the lower side frame 73. On an inner surface portion 62a arranged on the vehicle width direction inner side of the side frame 71, the inner side surface panel 62 has a bulging portion 65 that bulges to the vehicle width direction outer side relative to the vehicle width direction inner end portion of the upper side frame 72 and the lower side frame 73 in the vertical direction from the upper side frame side (an upper side frame region) to the lower side frame side (a lower side frame region) between the upper side frame 72 and the lower side frame 73.

The bulging portion 65 formed on the inner side surface panel 62 includes a tilt surface portion 65a arranged on the upper side frame side and tilting on the vehicle width direction outer side from the upper side frame side toward the lower side, a bottom surface portion 65b arranged on the lower side frame side and extending in a direction orthogonal to the vertical direction from the vehicle width direction inner side to the vehicle width direction outer side, and a vertical surface portion 65c extending upward from the vehicle width direction outer end portion of the bottom surface portion 65b to the tilt surface portion 65a.

The tilt surface portion 65a linearly tilts at a predetermined angle from the vehicle width direction inner side to the vehicle width direction outer side from the upper side to the lower side relative to the center in the vertical direction between the upper side frame 72 and the lower side frame 73. The vertical surface portion 65c extends upward in a substantially perpendicular direction. The bottom surface portion 65b extends in a substantially horizontal direction and is arranged to overlap the upper side of the lower side frame 73. As shown in FIG. 7, the bulging portion 65 also includes a front surface portion 65d and a rear surface portion 65e that are arranged on the vehicle body front side and the vehicle body rear side and extend in a direction orthogonal to the vehicle body longitudinal direction.

On the inner side surface panel 62, an upper side part 62c relative to a center part 62b where the bulging portion 65 is formed extends in a substantially perpendicular direction along the vehicle width direction inner side of the upper side frame 72, and a lower side part 62d relative to the center part 62b extends in a substantially perpendicular direction along the vehicle width direction inner side of the lower side frame 73. The upper side part 62c of the inner side surface panel 62 is arranged along an inner surface portion 72a of the upper side frame 72, and the lower side part 62d of the inner side surface panel 62 is arranged along an inner surface portion 73a of the lower side frame 73.

The upper side frame 72 includes a support surface portion 72a that supports the upper side part 62c of the side surface panel 61 from the vehicle width direction outer side, and the support surface portion 72a is formed by the inner surface portion 72a of the upper side frame 72. The lower side frame 73 includes a support surface portion 73a that supports the lower side part 62d of the side surface panel 61 from the vehicle width direction outer side, and the support surface portion 73a is formed by the inner surface portion 73a of the lower side frame 73.

As described above, the bottom surface panel 31 includes the upper side flange portion 33 extending upward from the bottom surface portion 32, and the upper side flange portion 33 is arranged outside the cargo bed of the inner side surface panel 62 along the vertical surface portion 65c and the bottom surface portion 65b of the bulging portion 65 and the lower side part 62d of the inner side surface panel 62. The inner side surface panel 62 is attached to the lower side frame 73 across the upper side flange portion 33 of the bottom surface panel 31.

As shown in FIG. 7, the inner side surface panel 62 is arranged on the vehicle width direction inner side of the front side frame 74 and the rear side frame 75 from the front side frame 74 to the rear side frame 75. The bulging portion 65 of the inner side surface panel 62 is provided between the front side frame 74 and the rear side frame 75 from the front side frame side to the rear side frame side, and has the cross-sectional shape that is perpendicular to the vehicle body longitudinal direction, the cross-sectional shape formed to be identical in the vehicle body longitudinal direction.

In the inner side surface panel 62, a front side part 62e relative to the center part 62b where the bulging portion 65 is formed constitutes a front side covering portion 62e covering the vehicle width direction inner side of the front side frame 74, and a rear side part 62f relative to the center part 62b where the bulging portion 65 is formed constitutes a rear side covering portion 62f covering the vehicle width direction inner side of the rear side frame 75. The bulging portion 65 is formed on the vehicle body rear side of the front side covering portion 62e and on the vehicle body front side of the rear side covering portion 62f.

As shown in FIG. 6, the bulging portion 65 is formed such that the vehicle width direction outer end portion is arranged on the vehicle width direction inner side relative to the vehicle width direction outer end portion of the side frame 71. In the side frame 71, the vehicle width direction outer end portion of the upper side frame 72 is arranged on the vehicle width direction outer side relative to the vehicle width direction outer end portion of the lower side frame 73, and the bulging portion 65 is arranged on the vehicle width direction inner side relative to an outer surface portion 72b that is the vehicle width direction outer end portion of the upper side frame 72. The bulging portion 65 is formed to bulge to the vehicle width direction outer side relative to an outer surface portion 73b, which is the vehicle width direction outer end portion of the lower side frame 73.

As shown in FIG. 7, the bulging portion 65 bulges to the vehicle width direction outer side relative to an inner surface portion 74a, which is the vehicle width direction inner end portion of the front side frame 74, and bulges to the vehicle width direction outer side relative to an inner surface portion 75a that is the vehicle width direction inner end portion of the rear side frame 75. The bulging portion 65 is formed on the vehicle width direction outer side relative to the vehicle width direction outer end portion of the rear surface panel 51.

The inner side surface panel 62 includes an upper surface portion 62g extending on the vehicle width direction outer side along an upper surface portion 72c of the upper side frame 72, which is an upper surface portion of the side frame 71 from the upper side part 62c. The upper surface portion 62g extends on the vehicle width direction outer side relative to the outer surface portion 72b of the upper side frame 72, which is the vehicle width direction outer end portion of the upper surface portion of the side frame 71.

Figure 8:
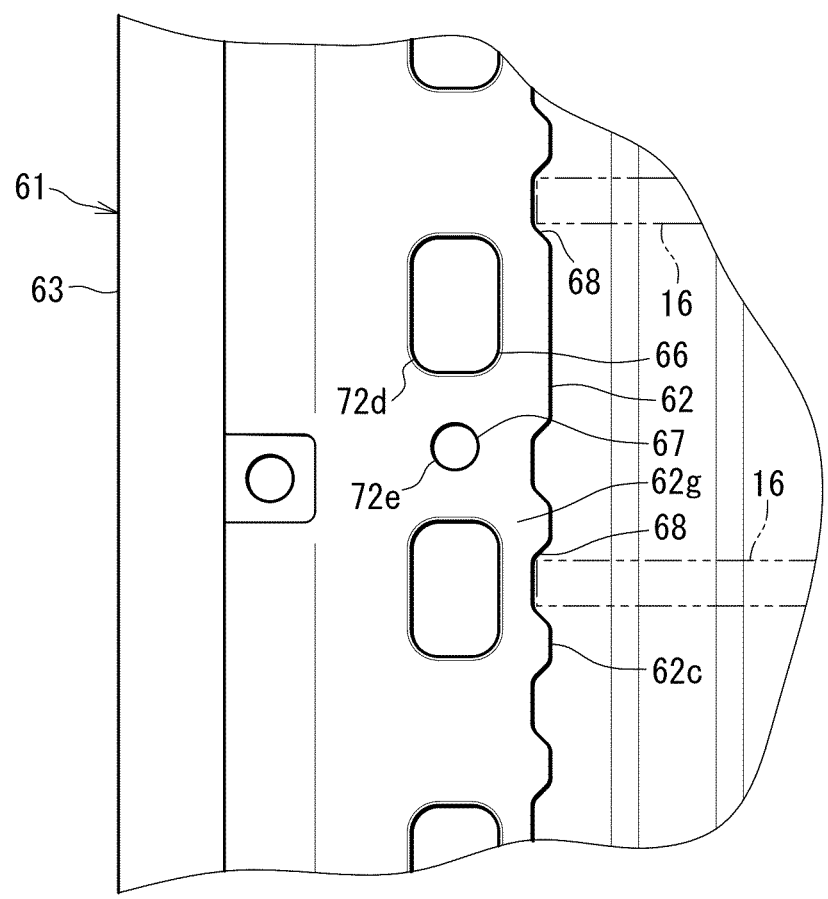
FIG. 8 is an enlarged view of a side wall top surface of the cargo bed.

FIG. 8 is an enlarged view of the side wall top surface of the cargo bed. As shown in FIG. 8, an accessory opening 66 is formed in a substantially rectangular shape on the upper surface portion 62g of the inner side surface panel 62. An accessory opening 72d formed in a substantially rectangular shape corresponding to the accessory opening 66 of the inner side surface panel 62 is also formed on the upper surface portion 72c of the upper side frame 72. A plurality of the accessory openings 66 and 72d are arranged at substantially equal intervals in the vehicle body longitudinal direction, and six of them are arranged in the utility vehicle 1.

In the upper side frame 72, an accessory such as a retention member that fixes and retains a partition plate is attached to the accessory opening 72d formed on the upper surface portion 72c extending in the vehicle width direction through the accessory opening 66 of the inner side surface panel 62. The accessory opening 72d can be used as an accessory attachment portion to which the accessory is attached.

Screw holes 72e are formed on the upper surface portion 72c of the upper side frame 72 on each of the vehicle body front side, the center side in the vehicle body longitudinal direction, and the vehicle body rear side. The screw hole 72e is provided between two accessory openings 72d arranged adjacently in the vehicle body longitudinal direction. A bolt insertion hole 67 is formed in the upper surface portion 62g of the inner side surface panel 62 so as to correspond to the screw hole 72e. By screwing a fastening bolt to the screw hole 72e through the bolt insertion hole 67, the inner side surface panel 62 is attached to the upper side frame 72.

As shown in FIG. 6, the outer side surface panel 63 includes a side surface portion 63a extending in the vertical direction and covering the vehicle width direction outer side of the bulging portion 65 of the inner side surface panel 62, and a bottom surface portion 63b extending from the lower end portion of the side surface portion 63a to the vehicle width direction inner side, and the upper end portion of the outer side surface panel 63 is attached to the upper surface portion 72c of the inner side surface panel 62 and joined to the inner side surface panel 62.

As shown in FIG. 7, the outer side surface panel 63 includes a front surface portion 63c and a rear surface portion 63d that extend in a direction orthogonal to the vehicle body longitudinal direction on the vehicle body front side and the vehicle body rear side, respectively. The front surface portion 63c is arranged on the vehicle body front side of the front side frame 74 of the side frame 71, and the rear surface portion 63d is arranged on the vehicle body rear side of the rear side frame 75 of the side frame 71.

On the cargo bed 20, rear lamp units 15 are arranged on each of both sides in the vehicle width direction in the rear of the vehicle body of the cargo bed 20, and the rear lamp units 15 are attached on the vehicle body rear side of the side surface panel 61. A lamp housing portion 63e recessed in a recess shape on a vehicle body front side is formed on the rear surface portion 63d of the outer side surface panel 63. The rear lamp unit 15 is arranged in the lamp housing portion 63e and attached to the outer side surface panel 63. The bulging portion 65 formed on the inner side surface panel 62 is arranged at a position overlapping with the rear lamp unit 15 in the vehicle width direction on the vehicle body front side of the rear lamp unit 15 as viewed from the rear of the vehicle body.

In the present embodiment, although one rear lamp unit 15 is arranged on each of the both sides in the vehicle width direction in the rear of the vehicle body of the cargo bed 20, a plurality of rear lamp units may be provided. Even in this case, the bulging portion 65 is arranged at a position overlapping at least one rear lamp unit in the vehicle width direction as viewed from the rear of the vehicle body.

As shown in FIG. 8, in the cargo bed 20, a plurality of partition recess portions 68 recessed in a substantially rectangular shape on the vehicle width direction outer side are also formed on each surface on the vehicle width direction inner side of the side surface panels 61 on both sides in the vehicle width direction, and the plurality of partition recess portions 68 are arranged separately in the vehicle body longitudinal direction. The partition recess portion 68 extends in a direction orthogonal with respect to the bottom surface panel 31 on the upper side part 62c of the vehicle body upper side relative to the bulging portion 65 of the inner side surface panel 62, and a partition plate 16 is locked. The partition recess portions 68 formed on the side surface panels 61 on both sides in the vehicle width direction are provided at positions opposed to the vehicle body longitudinal direction.

The partition plate 16 is formed in a substantially rectangular parallelepiped shape and has a length in the vehicle width direction substantially equal to the distance between the side surface panels 61 on both sides and has a height substantially equal to the height from the bottom surface panel 31 to the upper end portion of the side surface panel 61. The partition plate 16 is locked to the partition recess portions 68 of the side surface panels 61 on both sides in the vehicle width direction so as to partition the loading space 21 in the vehicle body longitudinal direction.

The thus configured cargo bed 20 includes the resin side surface panel 61 constituting the side wall 60 of the cargo bed 20, and a reinforcement member 71 that reinforces the side surface panel 61, specifically, the side surface panel 61 of the inner side surface panel 62 on the vehicle width direction outer side. The side surface panel 61 has the bulging portion 65 bulging on the vehicle width direction outer side as compared with the upper side part 62c and the lower side part 62d in the center part 62b of the inner side surface panel 62, and the bulging portion 65 is formed so as to bulge on the vehicle width direction outer side relative to the vehicle width direction inner end portion of the reinforcement member 71.

In the present embodiment, in the outer side surface panel 63 of the side surface panel 61, the side surface portion 63a is provided to be separated on the vehicle width direction outer side relative to the vehicle width direction outer end portion of the side frame 71, but the side surface portion 63a may be provided along the vehicle width direction outer end portion of the side frame 71.

Thus, in the cargo bed structure for the utility vehicle 1 according to the present embodiment, the cargo bed 20 includes the cargo bed frame 71 extending in the vehicle body longitudinal direction, and the side surface panel 61 covering the vehicle width direction inner side of the cargo bed frame 71, and the cargo bed frame 71 has the upper side frame 72 and the lower side frame 73 that are arranged separately in the vertical direction and extend in the vehicle body longitudinal direction. The side surface panel 61 is arranged on the vehicle width direction inner side of the upper side frame 72 and the lower side frame 73 from the upper side frame 72 through the lower side frame 73, and the side surface panel 61 has the bulging portion 65 bulging on the vehicle width direction outer side relative to the vehicle width direction inner end portion of the upper side frame 72 and the lower side frame 73 in the vertical direction from the upper side frame side to the lower side frame side.

Thus, since the side surface panel 61 arranged on the vehicle width direction inner side of the cargo bed frame 71 is provided with the bulging portion 65 that bulges to the vehicle width direction outer side relative to the vehicle width direction inner end portion of the upper side frame 72 and the lower side frame 73 from the upper side frame side to the lower side frame side, it is possible to increase the loading space 21 of the cargo bed 20 and increase the loading capacity of the cargo bed 20 by the bulging portion 65, compared with a case where the side surface panel 61 is not provided with a bulging portion. It is possible to reinforce the side surface panel 61 by the upper side frame 72 and the lower side frame 73, and it is possible to improve the strength of the cargo bed 20.

The bulging portion 65 includes the tilt surface portion 65a arranged on the upper side frame side and tilting on the vehicle width direction outer side from the upper side frame side toward the lower side. Thus, it is possible to make the loading space 21 of the cargo bed 20 larger in the lower side part of the cargo bed 20 than in the upper side part of the cargo bed 20, and it is possible to stably retain a loaded object on the cargo bed 20. When it is necessary to load a long object on the cargo bed 20 in the vehicle width direction, it is possible to suppress the load to the vehicle width direction outer side acting on the side surface panel 61 when the loaded object interferes with the tilt surface portion 65a of the side surface panel 61, and to guide the loaded object to the lower side of the cargo bed 20.

The bulging portion 65 includes the bottom surface portion 65b arranged on the lower side frame side and extending in the direction orthogonal to the vertical direction from the vehicle width direction inner side to the vehicle width direction outer side, and the vertical surface portion 65c extending upward from the vehicle width direction outer end portion of the bottom surface portion 65b. Thus, it is possible to increase the loading space 21 of the cargo bed 20 in the lower side part of the cargo bed 20 and increase the loading capacity of the cargo bed 20 as compared with the case where the lower end portion of the tilt surface portion 65a that tilts in the vehicle width direction outer side from the upper side frame side toward the lower side is connected to the vehicle width direction outer end portion of the bottom surface portion 65b without providing the vertical surface portion 65c.

The bulging portion 65 has the cross-sectional shape that is perpendicular to the vehicle body longitudinal direction, the cross-sectional shape formed to be identical in the vehicle body longitudinal direction. Thus, it is possible to increase the loading capacity of the cargo bed 20 by the bulging portion 65 in which the cross-sectional shape that is perpendicular to the vehicle body longitudinal direction is formed to be identical in the vehicle body longitudinal direction. When the loaded object is discharged by the dump mechanism 11 tilting the cargo bed 20 rearward, it is possible to easily move the loaded object rearward and easily discharge the loaded object.

The bulging portion 65 is formed such that the vehicle width direction outer end portion is arranged on the vehicle width direction inner side relative to the vehicle width direction outer end portion of the cargo bed frame 71. Thus, it is possible to increase the loading capacity of the cargo bed 20 while suppressing the cargo bed from becoming large due to the bulging portion 65 protruding on the vehicle width direction outer side relative to the vehicle width direction outer end portion of the cargo bed frame 71.

The cargo bed frame 71 has the front side frame 74 that couples the vehicle body front side of the upper side frame 72 and the lower side frame 73 and extends in the vertical direction, and the rear side frame 75 that couples the vehicle body rear side of the upper side frame 72 and the lower side frame 73 and extends in the vertical direction, the side surface panel 61 is arranged on the vehicle width direction inner side of the front side frame 74 and the rear side frame 75 at least from the front side frame 74 to the rear side frame 75, and the bulging portion 65 is provided between the front side frame 74 and the rear side frame 75. Thus, the bulging portion 65 is formed in a region surrounded by the upper side frame 72, the lower side frame 73, the front side frame 74, and the rear side frame 75, and it is possible to increase the loading capacity of the cargo bed 20 while suppressing the cargo bed 20 from becoming large.

The side surface panel 61 has the covering portion 62f covering the rear side frame 75, and the bulging portion 65 is formed on the vehicle body front side of the covering portion 62f. Thus, it is possible to increase the loading capacity of the cargo bed 20 by the bulging portion 65 while improving the rigidity of the side surface panel 61 by the covering portion 62f covering the rear side frame 75.

The bulging portion 65 bulges the vehicle width direction outer side relative to the vehicle width direction inner end portion 75a of the rear side frame 75. Thus, even in a case where the rear side frame 75 is provided, it is possible to increase the loading capacity of the cargo bed 20 by the bulging portion 65 bulging to the vehicle width direction outer side relative to the vehicle width direction inner end portion 75a of the rear side frame 75.

The side surface panel 61 includes the inner side surface panel 62 that is arranged on the vehicle width direction inner side of the cargo bed frame 71, and the outer side surface panel 63 that is arranged on the vehicle width direction outer side of the cargo bed frame 71, the inner side surface panel 62 extends toward the vehicle width direction outer side above the cargo bed frame 71 from the vehicle width direction inner side of the cargo bed frame 71, and is joined to the outer side surface panel 63, and the cargo bed frame 71 is arranged in the space portion 64 partitioned by the inner side surface panel 62 and the outer side surface panel 63. Thus, it is possible to suppress the cargo bed frame 71 from being exposed to the outside and the appearance from deteriorating, and it is possible to improve the appearance of the utility vehicle 1.

The cargo bed frame 71 is made of metal, and the side surface panel 61 is made of resin. Thus, it is possible to improve the strength of the cargo bed 20 by the metal cargo bed frame 71 while reducing the weight by the resin side surface panel 61.

The cargo bed 20 includes at least one rear lamp unit 15 that is arranged in the rear of a vehicle body of the cargo bed 20, and the bulging portion 65 is arranged on a vehicle body front side of the rear lamp unit 15 at a position overlapping the rear lamp unit 15 in a vehicle width direction as viewed from the rear of a vehicle body. Thus, it is possible, in the utility vehicle 1 including the rear lamp unit 15 in the cargo bed 20, to increase the loading capacity of the cargo bed 20 while suppressing the cargo bed 20 from becoming large in the vehicle width direction, as compared with the case where the bulging portion 65 of the side surface panel 61 and the rear lamp unit 15 are provided separately in the vehicle width direction.

The upper side frame 72 has the accessory attachment portion 72d extending in the vehicle width direction and attached with an accessory. Thus, it is possible to attach an accessory to the upper side frame 72, and even when the accessory is attached, it is possible to increase the loading capacity of the cargo bed 20 by the bulging portion 65 provided below the upper side frame 72.

The side surface panel 61 has the partition recess portion 68 arranged on the vehicle body upper side relative to the bulging portion 65 separately in the vehicle body longitudinal direction, and to which the partition plate 16 is locked. Thus, by locking the partition plate 16 to the partition recess portion 68 of the side surface panel 61, it is possible to partition the loading space 21 of the cargo bed 20 into a plurality of loading spaces by the partition plate 16, and it is possible to effectively use the loading space 21 of the cargo bed 20.

The bulging portion 65 includes the bottom surface portion 65b arranged to overlap the upper side of the lower side frame 73. Thus, even in a case where a heavy loaded object is loaded on the bottom surface portion 65b of the bulging portion 65, it is possible to transmit the load of the loaded object to the lower side frame 73 via the bottom surface portion 65b, and it is possible to support the heavy loaded object.

The lower side frame 73 includes the support surface portion 73a that supports the lower side part 62d relative to the bulging portion 65 of the side surface panel 61 from the vehicle width direction outer side. Thus, it is possible to suppress the lower side part 62d of the bulging portion 65 from deforming on the vehicle width direction outer side by causing the support surface portion 73a of the lower side frame 73 to support the lower side part 62d relative to the bulging portion 65 of the side surface panel 61 when a load to the vehicle width direction outer side is applied to the lower side part 62d of the bulging portion 65.

The bulging portion 65 is formed to bulge to the vehicle width direction outer side relative to the vehicle width direction outer end portion of the lower side frame 73. Thus, it is possible to increase the loading capacity of the cargo bed 20 by the bulging portion 65 bulging to the vehicle width direction outer side relative to the vehicle width direction outer end portion of the lower side frame 73.

The cargo bed 20 includes the tail gate 50 extending in the vehicle width direction on the vehicle body rear side, and the bulging portion 65 is formed on the vehicle width direction outer side relative to the vehicle width direction outer end portion of the tail gate 50. Thus, it is possible to increase the loading capacity of the cargo bed 20 by the bulging portion 65 formed on the vehicle width direction outer side relative to the vehicle width direction outer end portion of the tail gate 50.

The side surface panel 61 is made of resin, and the utility vehicle 1 is a dump vehicle in which the cargo bed 20 is configured to be tiltable. Thus, it is possible to reduce the weight of the side surface panel 61 as compared with the case where the side surface panel 61 is made of metal, and when the utility vehicle 1 is a dump vehicle, it is possible to make the cargo bed 20 easily tilt rearward.

In the cargo bed structure for the utility vehicle 1 according to the present embodiment, the cargo bed 20 includes the resin side surface panel 61 constituting the side wall 60 of the cargo bed 20, the side surface panel 61 has the bulging portion 65 bulging on the vehicle width direction outer side as compared with the upper side part 62c and the lower side part 62d in the center part 62b of the vertical direction, the reinforcement member 71 that reinforces the side surface panel 61 is provided on the vehicle width direction outer side of the side surface panel 61, and the bulging portion 65 is formed so as to bulge on the vehicle width direction outer side relative to the vehicle width direction inner end portion of the reinforcement member 71.

Thus, since the side surface panel 61 is provided with the bulging portion 65 that bulges to the vehicle width direction outer side, it is possible to increase the loading space 21 of the cargo bed 20 and increase the loading capacity of the cargo bed 20 by the bulging portion 65, compared with a case where the side surface panel 61 is not provided with a bulging portion. Since the reinforcement member 71 is provided on the vehicle width direction outer side of the resin side surface panel 61, and the bulging portion 65 is formed so as to bulge on the vehicle width direction outer side relative to the vehicle width direction inner end portion of the reinforcement member 71, it is possible to improve the strength of the cargo bed 20 while reinforcing the resin side surface panel 61 by the reinforcement member 71 and reducing the weight of the cargo bed 20, and it is possible to make the loading capacity of the cargo bed 20 larger by the bulging portion 65.

The present invention is not limited to the illustrated embodiment, and various modifications and design changes are possible without departing from the gist of the present invention.

What is claimed is:

1. A cargo bed structure for a utility vehicle that has a cargo bed in a vehicle body rear portion, wherein the cargo bed structure comprises:
    a cargo bed frame that extends in a vehicle body longitudinal direction; and
    a side wall that covers a vehicle width direction inner side of the cargo bed frame, wherein
    the cargo bed frame has an upper side frame and a lower side frame that are arranged separately in a vertical direction and extend in the vehicle body longitudinal direction,
    the side wall includes an inner side surface panel that is arranged on the vehicle width direction inner side of the cargo bed frame,
    the inner side surface panel is arranged on the vehicle width direction inner side of the upper side frame and the lower side frame from the upper side frame through the lower side frame,
    the inner side surface panel has a bulging portion that bulges from the vehicle width direction inner side to a vehicle width direction outer side, relative to a vehicle width direction inner end portion of the upper side frame and the lower side frame, as the inner side surface panel extends in the vertical direction from an upper side frame region to a lower side frame region, wherein the upper side frame region extends between the upper side frame and a center of a vertical height between the upper side frame and the lower side frame, and the lower side frame region extends between the lower side frame and the center of the vertical height between the upper side frame and the lower side frame,
    the bulging portion includes a tilt surface portion that extends from the upper side frame region and tilts toward the vehicle width direction outer side as the tilt surface portion extends to the lower side frame region, and a bottom surface portion that is arranged in the lower side frame region and extends horizontally inward, relative to a lowermost end of the tilt surface portion, toward the vehicle width direction inner side, and
    the bottom surface portion defines a portion of a loading space of the cargo bed structure and is exposed to the loading space.

2. The cargo bed structure for a utility vehicle according to claim 1, wherein
    the bulging portion includes a vertical surface portion that extends from an upper side of a vehicle width direction outer end portion of the bottom surface portion.

3. The cargo bed structure for a utility vehicle according to claim 1, wherein
    the bulging portion has a cross-sectional shape formed to be constant in the vehicle body longitudinal direction.

4. The cargo bed structure for a utility vehicle according to claim 1, wherein
    the bulging portion is formed such that a vehicle width direction outer end portion of the bulging portion is arranged on a vehicle width direction inner side relative to a vehicle width direction outermost end of the upper side frame.

5. The cargo bed structure for a utility vehicle according to claim 1, wherein
    the cargo bed frame has a front side frame that couples a vehicle body front side of the upper side frame and the lower side frame and extends in a vertical direction, and a rear side frame that couples a vehicle body rear side of the upper side frame and the lower side frame and extends in a vertical direction,
    the inner side surface panel is arranged on the vehicle width direction inner side of the front side frame and the rear side frame at least from the front side frame to the rear side frame, and
    the bulging portion is provided between the front side frame and the rear side frame.

6. The cargo bed structure for a utility vehicle according to claim 5, wherein
    the inner side surface panel has a covering portion that covers the rear side frame, and
    the bulging portion is formed on a vehicle body front side of the covering portion.

7. The cargo bed structure for a utility vehicle according to claim 5, wherein
    the bulging portion bulges toward the vehicle width direction outer side relative to a vehicle width direction innermost surface of the rear side frame.

8. The cargo bed structure for a utility vehicle according to claim 1, wherein
    the side wall includes an outer side surface panel that is arranged on a vehicle width direction outer side of the cargo bed frame,
    the inner side surface panel extends toward the vehicle width direction outer side above the cargo bed frame from the vehicle width direction inner side of the cargo bed frame, and is joined to the outer side surface panel, and
    the cargo bed frame is arranged in a space portion partitioned by the inner side surface panel and the outer side surface panel.

9. The cargo bed structure for a utility vehicle according to claim 1, wherein
    the cargo bed structure includes a rear lamp unit that is arranged in a rear of a the cargo bed structure in the vehicle body longitudinal direction, and
    the bulging portion is arranged on a vehicle body front side of the rear lamp unit at a position such that a width of the bulging portion and a width of the rear lamp unit overlap in the vehicle body longitudinal direction.

10. The cargo bed structure for a utility vehicle according to claim 1, wherein
    the upper side frame has an accessory attachment portion extending in a vehicle width direction and attached with an accessory.

11. The cargo bed structure for a utility vehicle according to claim 1, wherein
    the inner side surface panel has a partition recess portion arranged on a vehicle body upper side relative to the bulging portion, and wherein a partition plate is locked to the partition recess portion.

12. The cargo bed structure for a utility vehicle according to claim 1, wherein the bottom surface portion is arranged to overlap an upper side of the lower side frame.

13. The cargo bed structure for a utility vehicle according to claim 1, wherein
the inner side surface panel includes a lower side part which extends downward from a vehicle width direction innermost end of the bottom surface portion, and the lower side frame includes a support surface portion that supports the lower side part from a vehicle width direction outer side of the lower side part.

14. The cargo bed structure for a utility vehicle according to claim 1, wherein
the bulging portion is formed to bulge to the vehicle width direction outer side relative to a vehicle width direction outer end portion of the lower side frame.

15. The cargo bed structure for a utility vehicle according to claim 1, wherein
the cargo bed structure includes a tail gate extending in a vehicle width direction on a vehicle body rear side, and
the bulging portion is formed on the vehicle width direction outer side relative to a vehicle width direction outer end portion of the tail gate.

16. The cargo bed structure for a utility vehicle according to claim 1, wherein
the side wall is made of resin, and
the utility vehicle is a dump vehicle in which the cargo bed structure is configured to be tiltable.

17. The cargo bed structure for a utility vehicle according to claim 1, wherein
the cargo bed structure includes a bottom surface panel that constitutes a bottom wall of the cargo bed structure, and
the bottom surface panel includes an upper side flange portion that extends upward from a vehicle width direction outer side of the bottom surface panel.

18. A cargo bed structure for a utility vehicle that has a cargo bed in a vehicle body rear portion, wherein the cargo bed structure comprises:
a resin inner side surface panel that constitutes a side wall of the cargo bed structure, wherein
the inner side surface panel has, in a center part of the inner side surface panel relative to a vertical direction, a bulging portion that bulges from a vehicle width direction inner side at an upper side part of the inner side surface panel to a vehicle width direction outer side at a lower side part of the inner side surface panel,
a reinforcement member that reinforces the inner side surface panel is provided on the vehicle width direction outer side of the inner side surface panel,
the bulging portion is formed so as to bulge from the vehicle width direction inner side to the vehicle width direction outer side relative to a vehicle width direction inner end portion of the reinforcement member,
the reinforcement member has an upper side reinforcement member and a lower side reinforcement member that are arranged separately in the vertical direction and that extend in a vehicle body longitudinal direction,
the bulging portion has a bottom surface portion that is arranged in a lower side reinforcement member region and extends horizontally in the vehicle width direction, wherein the lower side reinforcement member region extends between the lower side reinforcement member and a center in the vertical direction between the upper side reinforcement member and the lower side reinforcement member, and
the bottom surface portion is arranged to overlap an uppermost surface of the lower side reinforcement member relative to the vertical direction.

19. A cargo bed structure for a utility vehicle that has a cargo bed in a vehicle body rear portion, wherein the cargo bed structure comprises:
a cargo bed frame that extends in a vehicle body longitudinal direction; and
a side wall that covers a vehicle width direction inner side of the cargo bed frame, wherein
the cargo bed frame has an upper side frame and a lower side frame that are arranged separately in a vertical direction and extend in the vehicle body longitudinal direction,
the side wall includes an inner side surface panel that is arranged on the vehicle width direction inner side of the cargo bed frame,
the inner side surface panel is arranged on the vehicle width direction inner side of the upper side frame and the lower side frame from the upper side frame through the lower side frame,
the inner side surface panel has a bulging portion that bulges from the vehicle width direction inner side to a vehicle width direction outer side, relative to a vehicle width direction inner end portion of the upper side frame and the lower side frame, as the inner side surface panel extends in the vertical direction from an upper side frame region to a lower side frame region, wherein the upper side frame region extends between the upper side frame and a center of a vertical height between the upper side frame and the lower side frame, and the lower side frame region extends between the lower side frame and the center of the vertical height between the upper side frame and the lower side frame,
the bulging portion includes a tilt surface portion that extends from the upper side frame region and tilts toward the vehicle width direction outer side as the tilt surface portion extends to the lower side frame region, and a bottom surface portion that is arranged in the lower side frame region and extends horizontally inward, relative to a lowermost end of the tilt surface portion, toward the vehicle width direction inner side,
the cargo bed structure includes a bottom surface panel that constitutes a bottom wall of the cargo bed structure, and
the bottom surface panel includes an upper side flange portion that extends upward from a vehicle width direction outer side of the bottom surface panel.

* * * * *